(12) United States Patent
MacDonnell et al.

(10) Patent No.: US 10,775,537 B2
(45) Date of Patent: Sep. 15, 2020

(54) SYSTEM AND METHOD FOR REMOTE SENSING FOR A TARGET

(71) Applicant: U.S.A. AS REPRESENTED BY THE ADMINISTRATOR OF NASA, Washington, DC (US)

(72) Inventors: David G. MacDonnell, Yorktown, VA (US); Wenbo Sun, Yorktown, VA (US); Yongxiang Hu, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 364 days.

(21) Appl. No.: 15/926,556

(22) Filed: Mar. 20, 2018

(65) Prior Publication Data

US 2018/0275322 A1 Sep. 27, 2018

Related U.S. Application Data

(60) Provisional application No. 62/474,124, filed on Mar. 21, 2017.

(51) Int. Cl.
*G02B 5/00* (2006.01)
*G01S 17/00* (2020.01)
(Continued)

(52) U.S. Cl.
CPC .............. *G02B 5/188* (2013.01); *G01N 21/21* (2013.01); *G01N 21/55* (2013.01); *G01S 7/4816* (2013.01);
(Continued)

(58) Field of Classification Search
USPC ................................. 356/4.01, 5.01
See application file for complete search history.

(56) References Cited

U.S. PATENT DOCUMENTS

| 7,362,420 B2 | 4/2008 | Zaugg |
| 7,428,041 B2 | 9/2008 | Kallio |

(Continued)

OTHER PUBLICATIONS

Sun, Wenbo et al., "Technique to Separate Lidar Signal and Sunlight," Optics Express 12949, Jun. 13, 2016, 6 pages, vol. 24, No. 12.

(Continued)

*Primary Examiner* — James R Hulka
(74) *Attorney, Agent, or Firm* — M. Bruce Harper; Andrea Z. Warmbier; Helen M. Galus

(57) ABSTRACT

A remote sensing system includes a primary beam configured to carry orbital angular momentum and characterized by a mode number (m), with the mode number (m) being a non-zero integer. The primary beam is configured to be directed at a target. A photon sieve is configured to receive a secondary beam emanating from the target. The secondary beam at least partially includes a portion of the primary beam. The photon sieve includes a plurality of holes forming one or more respective spiral patterns. The quantity of the respective spiral patterns in the photon sieve corresponds to the mode number (m) of the primary beam. The plurality of holes may be configured to have a minimum diameter such that the minimum diameter is greater than a predefined wavelength of the primary beam. The respective spiral patterns extend between a respective first hole and a respective final hole.

19 Claims, 3 Drawing Sheets

(51) Int. Cl.
*G02B 5/18* (2006.01)
*G01S 17/89* (2020.01)
*G01N 21/55* (2014.01)
*G01N 21/21* (2006.01)
*G01S 7/481* (2006.01)
*G01N 21/17* (2006.01)

(52) U.S. Cl.
CPC .............. *G01S 17/89* (2013.01); *G02B 5/005* (2013.01); *G01N 2021/1793* (2013.01)

(56) References Cited

U.S. PATENT DOCUMENTS

| | | | |
|---|---|---|---|
| 7,502,178 B2 | 3/2009 | Shenderova et al. | |
| 8,242,428 B2 | 8/2012 | Meyers et al. | |
| 8,744,741 B2* | 6/2014 | Brimble | G01S 7/4814 |
| | | | 701/301 |
| 8,873,168 B2* | 10/2014 | Boone | B64G 1/52 |
| | | | 359/742 |
| 10,274,805 B2* | 4/2019 | Tabirian | G02F 1/29 |
| 2004/0100637 A1* | 5/2004 | Teich | G01B 9/02007 |
| | | | 356/497 |
| 2007/0177735 A1* | 8/2007 | Mimih | H04L 9/0858 |
| | | | 380/256 |
| 2012/0261514 A1* | 10/2012 | Boone | B64G 1/222 |
| | | | 244/172.8 |
| 2013/0105747 A1* | 5/2013 | Galliher | B64G 1/407 |
| | | | 254/133 R |
| 2016/0123877 A1 | 5/2016 | Cvijetic et al. | |
| 2016/0169667 A1* | 6/2016 | Stork | G02B 27/4255 |
| | | | 356/496 |
| 2017/0139203 A1* | 5/2017 | Tabirian | G02B 27/4261 |

OTHER PUBLICATIONS

Ackerman, Evan "Cheap Lidar: The Key to Making Self-Driving Cars Affordable," https://spectrum.ieee.org/transporation/advanced-cars/cheap-lidar-the-key-to-making-selfdriving-cars-affordable, accessed on Jan. 23, 2018, Sep. 22, 2016.

* cited by examiner

SYSTEM AND METHOD FOR REMOTE SENSING FOR A TARGET

CROSS-REFERENCE TO RELATED PATENT APPLICATION(S)

This patent application claims the benefit of and priority to U.S. provisional patent application 62/474,124, filed on Mar. 21, 2017, the contents of which are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Light Detection and Ranging (LIDAR) systems are often used to measure atmospheric, geologic, oceanic, biological and other properties of earth and various other celestial bodies. For example, LIDAR may be used to detect and measure the concentration of various chemicals in the atmosphere. Such systems may employ a reflector dish to collect radiation reflected or backscattered from the subject of interest and direct it towards a system detector. When the diameter of the reflector dish is increased to achieve the required signal level, the background noise in the signal increases. Many system detectors may reach a saturation point as a result of the increased background noise. Accordingly, there is a need to increase the signal level for a remote sensing system, while reducing the noise and maintaining the phase of the signal.

BRIEF SUMMARY OF THE INVENTION

The present invention includes a remote sensing system. The remote sensing system includes a primary beam configured to carry orbital angular momentum and characterized by a mode number (m), with the mode number (m) being a non-zero integer. The primary beam is configured to be directed at a target. A photon sieve is configured to receive a secondary beam emanating from the target. The secondary beam at least partially includes a portion of the primary beam scattered or reflected from the target. The photon sieve includes a plurality of holes forming one or more respective spiral patterns. The quantity of the respective spiral patterns in the photon sieve corresponds to the mode number (m) of the primary beam.

One embodiment of the invention is that the respective spiral patterns extend between a respective first hole and a respective final hole. The respective first hole is within a first radius from a center of the photon sieve and the respective final hole is within a final radius from the center, the final radius being greater than the first radius. If the mode number (m) is a positive integer, the respective spiral patterns in the photon sieve are configured to extend from the respective first hole to the respective final hole in a clockwise direction. If the mode number (m) is a negative integer, the respective spiral patterns in the photon sieve are configured to extend from the respective first hole to the respective final hole in a counter-clockwise direction.

Another embodiment of the invention is that the plurality of holes may be configured to have a minimum diameter such that the minimum diameter is greater than a predefined wavelength of the primary beam. The respective spiral patterns in the photon sieve may be configured to extend in a respective descending order of size such that the respective first hole is larger than the respective final hole. The respective first hole of adjacent ones of the respective spiral patterns may be spaced by a first angle relative to the center of the photon sieve. The first angle is based partially on the mode number (m), with the first angle being defined as $$\left(\frac{360}{m}\right)$$

degrees. The respective final hole of adjacent ones of the respective spiral patterns may be spaced by a final angle relative to the center of the photon sieve. The final angle is based partially on the mode number (m), with the final angle being defined as $$\left(\frac{360}{m}\right)$$

degrees.

Yet another embodiment of the invention is that the respective first hole of each of the respective spiral patterns may be equidistant from a center of the photon sieve. The respective final hole of each of the respective spiral patterns may be equidistant from the center of the photon sieve.

The present invention includes a method of remote sensing. The method includes producing a primary beam carrying orbital angular momentum, the primary beam characterized by a non-zero mode number (m). The primary beam is directed at a target. The method includes creating a photon sieve with a plurality of holes forming one or more respective spiral patterns, with the respective spiral patterns having a respective first hole and a respective final hole. The respective first hole is within a first radius from a center of the photon sieve and the respective final hole is within a final radius from the center, the final radius being greater than the first radius. The method includes positioning the photon sieve relative to the target such that the photon sieve receives a secondary beam emanating from the target. The secondary beam at least partially includes a portion of the primary beam scattered from the target.

These and other features, advantages, and objects of the present invention will be further understood and appreciated by those skilled in the art by reference to the following specification, claims, and appended drawings.

DETAILED DESCRIPTION OF THE INVENTION

Figure 1:
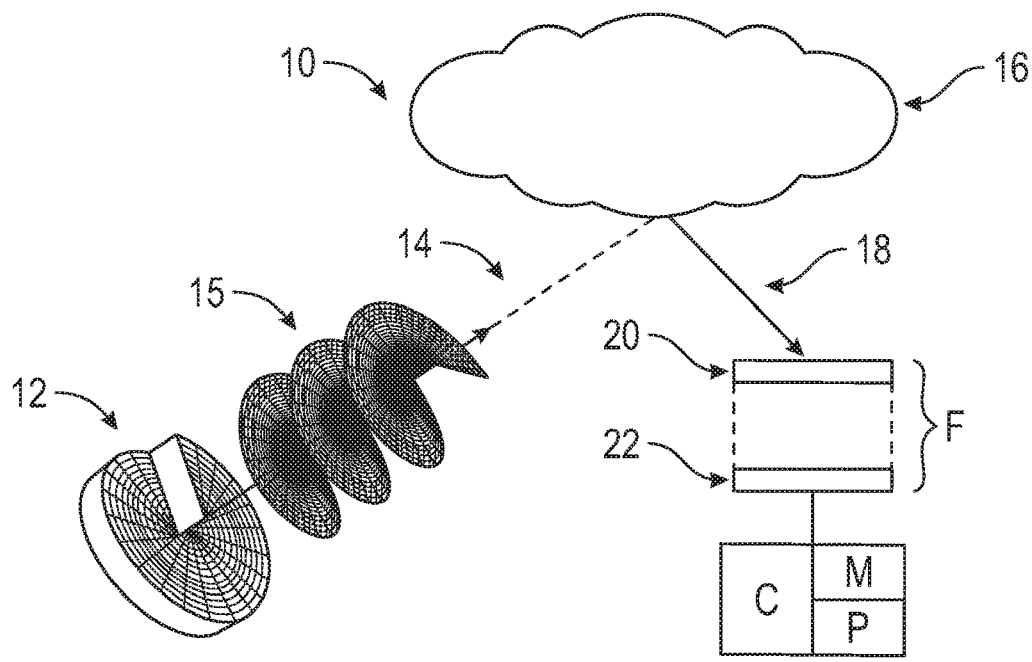
FIG. 1 is a schematic illustration of a remote sensing system having a photon sieve with a plurality of holes forming one or more respective spiral patterns.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the Figures, wherein like reference numbers refer to the same or similar components throughout the several views, FIG. 1 is a schematic view of a remote sensing system 10. Referring to FIG. 1, a source 12 is configured to produce a primary beam 14. The primary beam 14 is configured to carry orbital angular momentum (OAM) and is characterized by a non-zero mode number (m). The primary beam 14 is configured to include one or more helical wave fronts 15 composed of m distinct and intertwined helices. The mode number (m) may be a positive or negative integer. In one example, the primary beam 14 is created by introducing a gradient phase delay to a Gaussian laser beam, which induces a spiraling phase pattern wave front. Spatial light modulators or spiral phase plates may be employed to convert a laser beam with parallel wave-front into a beam carrying an orbital angular momentum. In another example, a pair of cylindrical lenses (not shown) may be employed to convert Hermite-Gaussian modes into desired Laguerre-Gaussian (LG) modes with helical phase structure. Other suitable methods may be employed to create the helical wave fronts 15.

Referring to FIG. 1, the primary beam 14 is configured to be directed at a target 16. For example, the target 16 may include, but is not limited to, an atmospheric layer or oceanic layer of earth or another celestial body. The target 16 may include single or multiple objects. The term "remote sensing" refers to information gathered about a target 16 from a distance, as opposed to on-site observation. The remote sensing system 10 may include, but is not limited to, on the ground (earth), on an aircraft, on a satellite or on the ground of another celestial body.

Referring to FIG. 1, the remote sensing system 10 includes a photon sieve 20 configured to receive the secondary beam 18 emanating from the target. The secondary beam 18 at least partially includes a portion of the primary beam 14 scattered from the target 16. It is to be understood that the remote sensing system 10 may include various combinations of collimators and lenses (not shown) for guiding the primary beam 14 and the secondary beam 18. Indeed, the remote sensing system 10 may include multiple and/or alternate components and facilities.

Referring to FIG. 1, a detector 22 is positioned at a predetermined focal distance F from the photon sieve 20. For example, the detector 22 may be a charge-coupled detector. A controller C may be operatively connected to the detector 22 and has a processor P and tangible, non-transitory memory M. The controller C may be programmed to analyze the phase pattern of the signal obtained by the detector 22.

Figure 2:
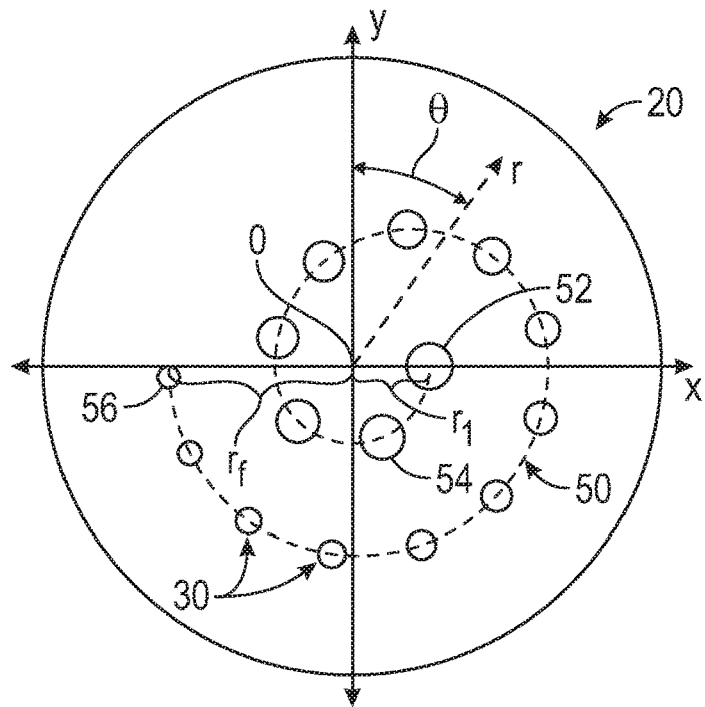
FIG. 2 is a schematic diagram of an example photon sieve having one spiral pattern extending clockwise.
Figure 3:
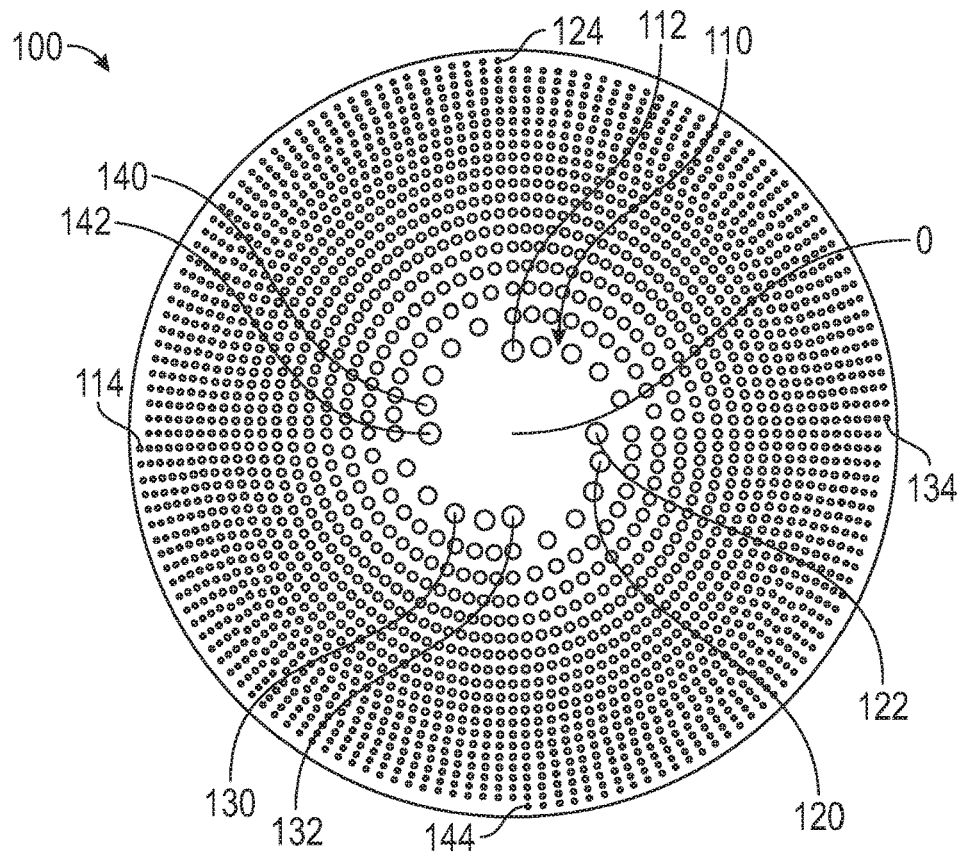
FIG. 3 is a schematic diagram of an example photon sieve having four spiral patterns respectively extending clockwise.
Figure 4:
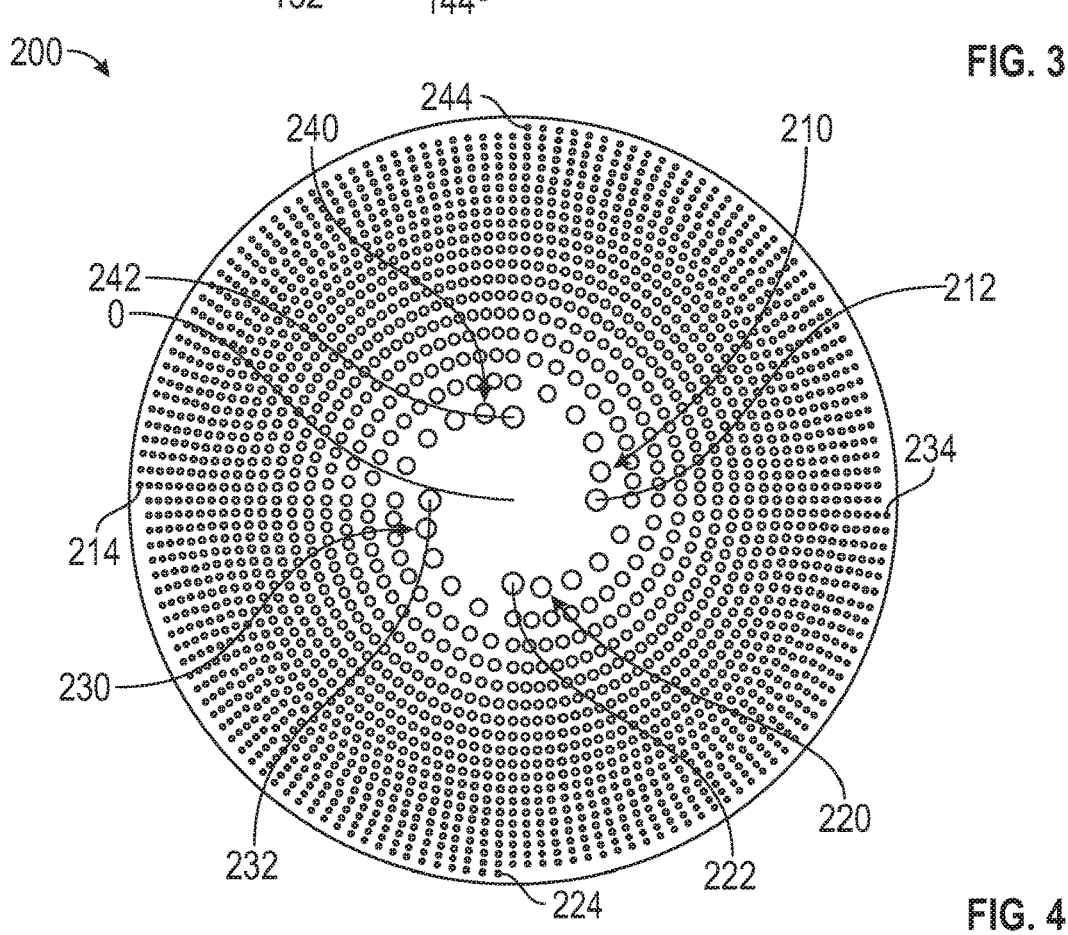
FIG. 4 is a schematic diagram of an example photon sieve having four spiral patterns respectively extending counter-clockwise.
Figure 5:
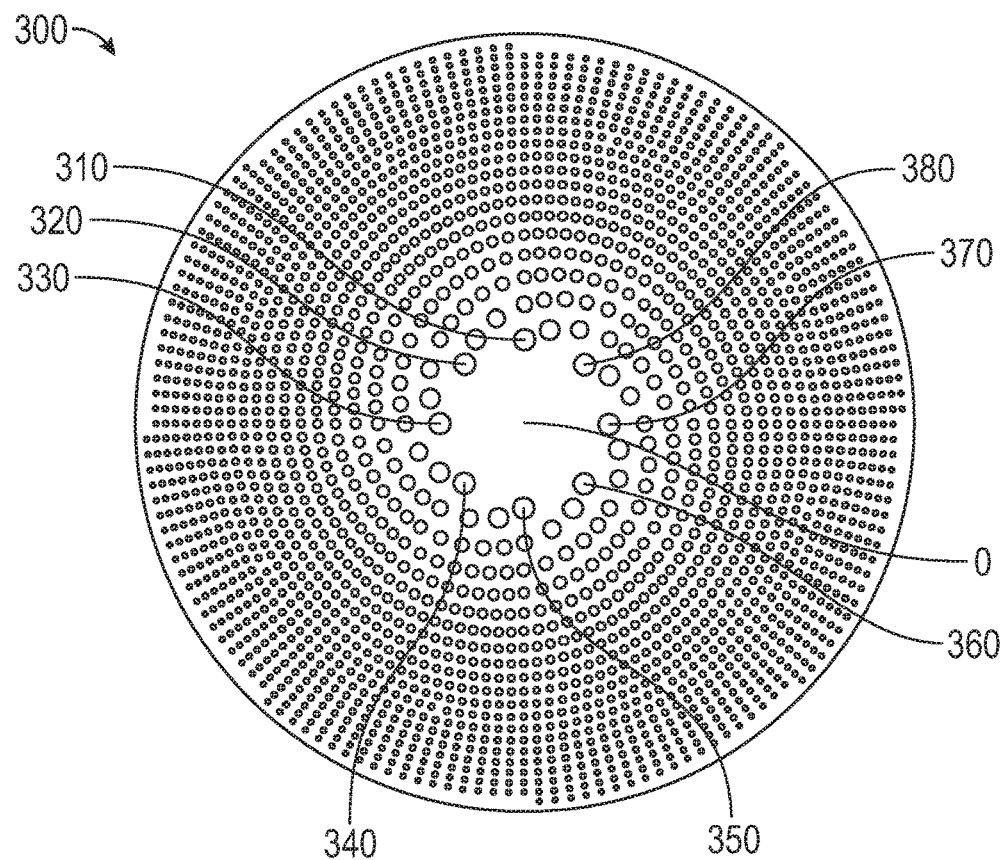
FIG. 5 is a schematic diagram of an example photon sieve having eight spiral patterns respectively extending clockwise.

An example configuration for the photon sieve 20 is shown in FIG. 2. Other example configurations are shown in FIGS. 3-5. Referring to FIG. 2, the photon sieve 20 includes a plurality of holes 30 forming one or more respective spiral patterns, such as spiral pattern 50 shown in FIG. 2. Radiation passing through the photon sieve 20 diffracts around the edges of the plurality of holes 30. In one example, the holes 30 are devoid of any material. In another example, the plurality of holes 30 include embedded transparent material configured to allow the secondary beam 18 to at least partially pass through.

The plurality of holes 30 may be configured to have a minimum diameter, the minimum diameter being greater than or equal to a predefined wavelength of the primary beam 14. In other words, the smallest of the plurality of holes 30 has a diameter greater than or equal to the predefined wavelength of the primary beam 14. In a non-limiting example, the wavelength of the primary beam 14 is about 532 nanometers.

Referring to FIG. 2, the spiral pattern 50 extends between a respective first hole 52 and a respective final hole 56. The quantity of respective spiral patterns in the photon sieve 20 corresponds to the mode number (m) of the primary beam 14. If the mode number (m) is a positive integer, the respective spiral patterns are configured to extend from the respective first hole 52 to the respective final hole 56 in a clockwise direction (as in FIGS. 2, 3 and 5). If the mode number (m) is a negative integer, the respective spiral patterns are configured to extend from the respective first hole 42 to the respective final hole 56 in a counter-clockwise direction (as in FIG. 4).

Referring to FIG. 2, the respective positions of the plurality of holes 30 may be expressed in a Cartesian coordinate system (with horizontal axis x and vertical axis y) or in a spherical coordinate system (r, θ), where r is the distance from the center O and θ is measured relative to the vertical axis y. The respective first hole 52 is within a first radius ($r_1$) from a center O of the photon sieve 20 and the respective final hole 56 is within a final radius ($r_f$) from the center O, the final radius ($r_f$) being greater than the first radius ($r_1$). The spiral pattern 50 is configured to extend in a descending order of size from the respective first hole 52 such that each hole in the spiral pattern 50 is either less than or equal to in size to its predecessor. For example, the respective second hole 54 in FIG. 2 is less than or equal to in size to the respective first hole 52.

FIG. 3 illustrates another example of a photon sieve that may be employed in the remote sensing system 10 of FIG. 1. Referring to FIG. 3, a first photon sieve 100 includes a plurality of holes forming respective spiral patterns 110, 120, 130, 140, which extend in a clockwise direction. The first photon sieve 100 may be employed in combination with a primary beam 14 having a mode number of positive four (m=4). The respective spiral pattern 110 extends from the respective first hole 112 to the respective final hole 114. The respective spiral pattern 120 extends from the respective first hole 122 to the respective final hole 124. The respective spiral pattern 130 extends from the respective first hole 132 to the respective final hole 134. The respective spiral pattern 140 extends from the respective first hole 142 to the respective final hole 144. In the example shown in FIG. 3, the respective first holes 112, 122, 132, 142 are equidistant from the center O, i.e., are equally spaced from the center O. In the example shown in FIG. 3, the respective final holes 114, 124, 134, 144 are equidistant from the center O.

Referring to FIG. 3, the first photon sieve 100 is configured such that adjacent ones of the respective first holes 112, 122, 132, 142 are spaced by a first angle relative to the center O. The first angle is partly based on the mode number (m), with the first angle being defined as $$\left(\frac{360}{m}\right)$$

degrees, which is 90 degrees here. Similarly, adjacent ones of the respective final holes 114, 124, 134, 144 are spaced by a final angle relative to the center O. The final angle is based on the mode number (m), with the final angle being defined as $$\left(\frac{360}{m}\right)$$

degrees, which is 90 degrees here.

FIG. 4 illustrates another example of a photon sieve that may be employed in the remote sensing system 10 of FIG. 1. Referring to FIG. 4, a second photon sieve 200 includes a plurality of holes forming respective spiral patterns 210, 220, 230, 240, which extend respectively in a counter-clockwise direction. The second photon sieve 200 may be employed in combination with a primary beam 14 having a mode number of negative four (m=−4). The respective spiral pattern 210 extends from the respective first hole 212 to the respective final hole 214. The respective spiral pattern 220 extends from the respective first hole 222 to the respective final hole 224. The respective spiral pattern 230 extends from the respective first hole 232 to the respective final hole 234. The respective spiral pattern 240 extends from the respective first hole 242 to the respective final hole 244. In the example shown in FIG. 4, the respective first holes 212, 222, 232, 242 are equidistant from the center O. In the example shown in FIG. 4, the respective final holes 214, 224, 234, 244 are equidistant from the center O.

Referring to FIG. 4, the second photon sieve 200 is configured such that the respective first holes 212, 222, 232, 242 of adjacent ones of the respective spiral patterns 210, 220, 230, 240 are spaced by a final angle based on the mode number (m), with the first angle being defined as $$\left(\frac{360}{m}\right)$$

degrees, which is −90 degrees here. Similarly, the respective final holes 214, 224, 234, 244 of adjacent ones of the respective spiral patterns 210, 220, 230, 240 are spaced by a final angle based on the mode number (m), with the final angle being defined as $$\left(\frac{360}{m}\right)$$

degrees, which is −90 degrees here.

FIG. 5 is yet another example of a photon sieve that may be employed in the remote sensing system 10 of FIG. 1. Referring to FIG. 5, a third photon sieve 300 includes a plurality of holes forming eight spiral patterns (labeled 310, 320, 330, 340, 350, 360, 370 and 380), extending respectively in a clockwise direction. The third photon sieve 300 may be employed in combination with a primary beam 14 having a mode number of positive eight (m=8). In the example shown in FIG. 5, the respective first holes of the eight spiral patterns (labeled 310, 320, 330, 340, 350, 360, 370 and 380) are equidistant from the center O, i.e., have the same radius ($r_1$) shown in FIG. 1, and adjacent ones are spaced by the first angle (360/m=360/8=45 degrees). Additionally, the respective final holes of the eight spiral patterns (labeled 310, 320, 330, 340, 350, 360, 370 and 380) are equidistant from the center O, i.e., have the same radius ($r_f$) shown in FIG. 1, and adjacent ones are spaced by the final angle (360/m=360/8=45 degrees).

Figure 6:
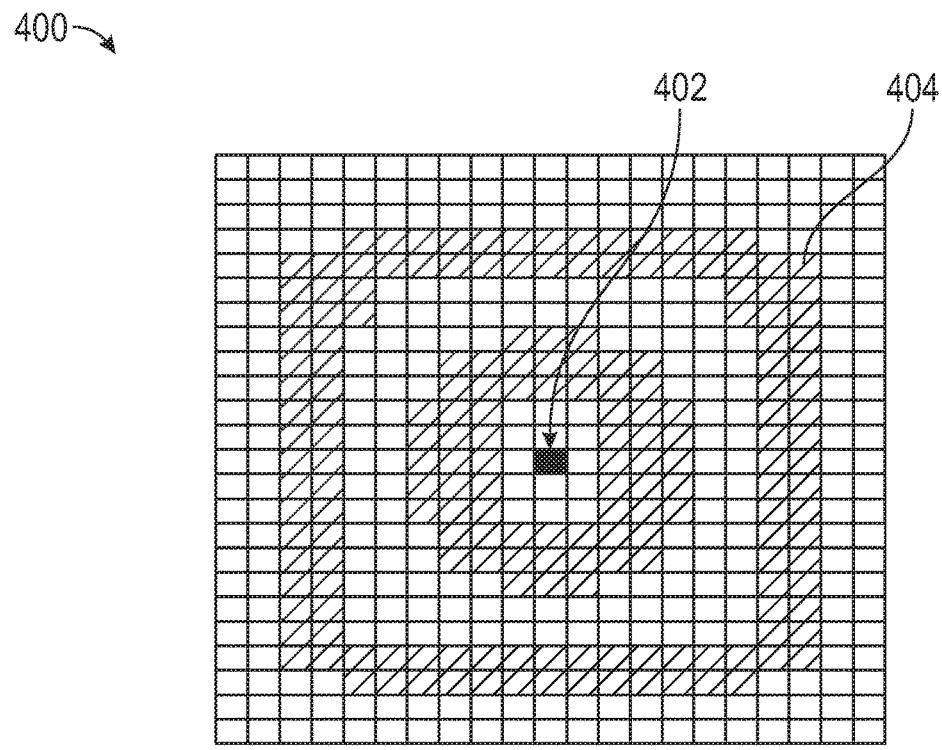
FIG. 6 is an example of a signal map obtained by a detector in the remote sensing system of FIG. 1.

FIG. 6 is an example of a signal map 400 obtained by the remote sensing system 10. Region 402 (filled pixel) is a relatively high intensity signal, representing the orbital angular momentum (OAM) signal and characteristics of the target 16. Region 404 (hatched pixels) is a relatively low intensity signal, representing background noise. The photon sieve 20 (and first, second and third photon sieves 100, 200, 300) is configured to force the orbital angular momentum (OAM) signal in the secondary beam 18 to focus at the center of the detector 22 (focal plane) using constructive interference for amplification, while the non-OAM signal fails to focus. The remote sensing system 10 has the technical advantage of being a low cost and deployable telescope option for LIDAR of communication applications.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A remote sensing system comprising:
   a primary beam configured to carry orbital angular momentum and characterized by a mode number (m), the mode number (m) being a non-zero integer;
   wherein the primary beam is configured to be directed at a target;
   a photon sieve configured to receive a secondary beam emanating from the target, the secondary beam at least partially including a portion of the primary beam scattered from the target;
   wherein the photon sieve includes a plurality of holes forming one or more respective spiral patterns; and
   wherein a quantity of the respective spiral patterns in the photon sieve corresponds to the mode number (m) of the primary beam.

2. The remote sensing system of claim 1, wherein:
the plurality of holes are configured to have a minimum diameter, the minimum diameter being greater than a predefined wavelength of the primary beam.

3. The remote sensing system of claim 1, wherein:
the respective spiral patterns extend between a respective first hole and a respective final hole; and
the respective first hole is within a first radius from a center of the photon sieve and the respective final hole is within a final radius from the center, the final radius being greater than the first radius.

4. The remote sensing system of claim 3, wherein:
the mode number (m) is a positive integer and the respective spiral patterns in the photon sieve are configured to extend from the respective first hole to the respective final hole in a clockwise direction.

5. The remote sensing system of claim 3, wherein:
the mode number (m) is a negative integer and the respective spiral patterns in the photon sieve are configured to extend from the respective first hole to the respective final hole in a counter-clockwise direction.

6. The remote sensing system of claim 3, wherein:
the respective spiral patterns extend between the respective first hole and the respective final hole in a descending order of size such that the respective first hole is larger than the respective final hole.

7. The remote sensing system of claim 3, wherein:
the respective first hole of adjacent ones of the respective spiral patterns are spaced by a first angle relative to a center of the photon sieve; and
the first angle is based partially on the mode number (m), the first angle being defined as $$\left(\frac{360}{m}\right)$$

degrees.

8. The remote sensing system of claim 3, wherein:
the respective final hole of adjacent ones of the respective spiral patterns are spaced by a final angle relative to a center of the photon sieve; and
the final angle is based partially on the mode number (m), the final angle being defined as $$\left(\frac{360}{m}\right)$$

degrees.

9. The remote sensing system of claim 3, wherein:
the respective first hole of each of the respective spiral patterns is equidistant from the center of the photon sieve; and
the respective final hole of each of the respective spiral patterns are equidistant from the center of the photon sieve.

10. A method of remote sensing for a target, the method comprising:
producing a primary beam carrying orbital angular momentum and characterized by a mode number (m), the mode number (m) being a non-zero integer;
directing the primary beam at the target;
creating a photon sieve with a plurality of holes forming one or more respective spiral patterns, the respective spiral patterns having a respective first hole and a respective final hole;
wherein the respective first hole is within a first radius from a center of the photon sieve and the respective final hole is within a final radius from the center, the final radius being greater than the first radius;
positioning the photon sieve relative to the target such that the photon sieve receives a secondary beam emanating from the target, the secondary beam at least partially including a portion of the primary beam scattered from the target; and
wherein a quantity of the respective spiral patterns in the photon sieve corresponds to the mode number (m) of the primary beam.

11. The method of claim 10, further comprising:
configuring the plurality of holes with a minimum diameter, the minimum diameter being greater than a wavelength of the primary beam.

12. The method of claim 10, further comprising:
if the mode number (m) is a positive integer, extending the respective spiral patterns in the photon sieve from the respective first hole to the respective final hole in a clockwise direction.

13. The method of claim 10, further comprising:
if the mode number (m) is a negative integer, extending the respective spiral patterns in the photon sieve from the respective first hole to the respective final hole in a counter-clockwise direction.

14. The method of claim 10, further comprising:
extending the respective spiral patterns in a respective descending order of size such that the respective first hole is larger than the respective final hole.

15. The method of claim 10, further comprising:
spacing the respective first hole of adjacent ones of the respective spiral patterns by a first angle relative to a center of the photon sieve; and
wherein the first angle is based partially on the mode number (m), the first angle being defined as $$\left(\frac{360}{m}\right)$$

degrees.

16. The method of claim 10, further comprising:
spacing the respective final hole of adjacent ones of the respective spiral patterns by a final angle relative to the center of the photon sieve; and
wherein the final angle is based partially on the mode number (m), the final angle being defined as $$\left(\frac{360}{m}\right)$$

degrees.

17. A remote sensing system comprising:
a primary beam configured to carry orbital angular momentum and characterized by a mode number (m), the mode number (m) being a non-zero integer;
wherein the primary beam is configured to be directed at a target;
a photon sieve configured to receive a secondary beam emanating from the target, the secondary beam at least partially including a portion of the primary beam;
wherein the photon sieve includes a plurality of holes forming one or more respective spiral patterns;

wherein a quantity of the respective spiral patterns in the photon sieve corresponds to the mode number (m) of the primary beam;

wherein the respective spiral patterns extend between a respective first hole and a respective final hole, the respective first hole being within a first radius from a center of the photon sieve, the respective final hole being within a final radius from the center and the final radius being greater than the first radius;

wherein the respective first hole of adjacent ones of the respective spiral patterns are spaced by a first angle relative to the center of the photon sieve; and wherein the first angle is based partially on the mode number (m), the first angle being defined as $$\left(\frac{360}{m}\right)$$

degrees.

18. The remote sensing system of claim 17, wherein:

the respective final hole of adjacent ones of the respective spiral patterns is spaced by a final angle relative to the center of the photon sieve; and the final angle is based partially on the mode number (m), the final angle being defined as $$\left(\frac{360}{m}\right)$$

degrees.

19. The remote sensing system of claim 18, wherein:

the respective first hole of each of the respective spiral patterns is equidistant from the center of the photon sieve; and the respective final hole of each of the respective spiral patterns is equidistant from the center of the photon sieve.

* * * * *